United States Patent
Han et al.

(10) Patent No.: US 9,450,441 B2
(45) Date of Patent: Sep. 20, 2016

(54) MOBILE TERMINAL, AND DEVICE AND METHOD FOR CHARGING SAME

(75) Inventors: Zhengwei Han, Shenzhen (CN); Nirong Wang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 190 days.

(21) Appl. No.: 14/369,969

(22) PCT Filed: Apr. 19, 2012

(86) PCT No.: PCT/CN2012/074386
§ 371 (c)(1),
(2), (4) Date: Jul. 23, 2014

(87) PCT Pub. No.: WO2013/097381
PCT Pub. Date: Jul. 4, 2013

(65) Prior Publication Data
US 2014/0368159 A1 Dec. 18, 2014

(30) Foreign Application Priority Data
Dec. 28, 2011 (CN) .......................... 2011 1 0446295

(51) Int. Cl.
*H02J 7/04* (2006.01)
*H02J 7/00* (2006.01)
*H02M 3/155* (2006.01)

(52) U.S. Cl.
CPC .............. *H02J 7/007* (2013.01); *H02J 7/0004* (2013.01); *H02J 7/0072* (2013.01); *H02M 3/155* (2013.01); *H02J 7/0042* (2013.01); *H02J 2007/0059* (2013.01); *H02J 2007/0062* (2013.01)

(58) Field of Classification Search
CPC ................... H02J 7/007; H02J 7/0042; H02J 2007/0059; H02J 2007/0062
USPC .................................................. 320/107, 162
See application file for complete search history.

(56) References Cited

U.S. PATENT DOCUMENTS

| 5,652,520 | A | * | 7/1997 | Kawamoto | ............. | F02P 17/12 324/388 |
| 7,768,292 | B1 | * | 8/2010 | Koch | ..................... | G01R 31/40 324/764.01 |
| 7,834,591 | B2 | | 11/2010 | Hussain et al. | | |
| 8,519,569 | B2 | * | 8/2013 | Shimokawa | .......... | B60L 11/182 307/104 |

(Continued)

FOREIGN PATENT DOCUMENTS

| CN | 1540833 A | 10/2004 |
| CN | 1801570 A | 7/2006 |

(Continued)

OTHER PUBLICATIONS

International Search Report in international application No. PCT/CN2012/074386, mailed on Oct. 18, 2012. (2 pages—see entire document).

(Continued)

*Primary Examiner* — M'Baye Diao
(74) *Attorney, Agent, or Firm* — Oppedahl Patent Law Firm LLC (57) ABSTRACT

A mobile terminal, and a device and method for charging the same are provided. A power input of a Voltage Bus (VBUS) of a Universal Serial Bus (USB) interface in the mobile terminal is connected to a switch capable of switching off and switching on the power input of the VBUS. During charging, the mobile terminal controls the switch to control an input current to generate a specific current waveform; and a charging device is internally provided with a circuit for detecting the specific current waveform. If the circuit detects the specific current waveform generated by the mobile terminal, an output voltage of the charging device is increased to charge the mobile terminal. The charging device increases the charging power of the USB interface.

14 Claims, 5 Drawing Sheets

(56) References Cited

U.S. PATENT DOCUMENTS

| | | | |
|---|---|---|---|
| 9,207,735 B2* | 12/2015 | Khaitan | G06F 1/263 |
| 2007/0188134 A1 | 8/2007 | Hussain et al. | |
| 2010/0164440 A1 | 7/2010 | Ikeda | |
| 2010/0219790 A1 | 9/2010 | Chadbourne | |
| 2011/0043162 A1 | 2/2011 | Lee et al. | |
| 2011/0068750 A1 | 3/2011 | Sun et al. | |
| 2011/0241627 A1 | 10/2011 | Arai | |
| 2012/0326656 A1 | 12/2012 | Ikeda | |
| 2013/0002195 A1 | 1/2013 | Lee et al. | |
| 2013/0002196 A1 | 1/2013 | Lee et al. | |

FOREIGN PATENT DOCUMENTS

| | | |
|---|---|---|
| CN | 101026309 A | 8/2007 |
| CN | 101232196 A | 7/2008 |
| CN | 101989749 A | 3/2011 |
| CN | 102064582 A | 5/2011 |
| EP | 2202864 A2 | 6/2010 |
| EP | 2383861 A2 | 11/2011 |
| JP | 2003263245 A | 9/2003 |
| JP | 2006302733 A | 11/2006 |
| WO | 2010099483 A2 | 9/2010 |

OTHER PUBLICATIONS

English Translation of the Written Opinion of the International Search Authority in international application No. PCT/CN2012/074386, mailed on Oct. 18, 2012. (6 pages—see entire document).

Supplementary European Search Report in European application No. 12863290.8, mailed on Oct. 12, 2015.

* cited by examiner

MOBILE TERMINAL, AND DEVICE AND METHOD FOR CHARGING SAME

TECHNICAL FIELD

The disclosure relates to the field of communication technologies, and more particularly to a mobile terminal, and a device and method for charging the same.

BACKGROUND

With the rapid development of mobile terminal technology, such products as a tablet Personal Computer (PC), a mobile phone, a portable media player, a portable navigator and an electronic reader come into a lot of families to be widely applied. For these portable terminals, the unified use of a standard Universal Serial Bus (USB) interface for charging is an inevitable trend. The government of China and European Union have made some mandatory or voluntary laws and regulations, such as Technical Requirements and Testing Methods for Charger and Interface of Mobile Communication Handset. These regulations are significant for improving the charging convenience, reducing the consumption cost, saving social resources, reducing electronic waste, controlling the emission of greenhouse gas and the like.

For a standard USB host interface for which the charging voltage and charging current are 5V and 500 mA respectively, the charging power is only 2.5 W. To solve the problem of charging a battery of large capacity quickly, a special circuit, which may recognize the category of a power supply end, is often designed in a mobile terminal device. If it recognizes that a user adopts a power adapter instead of the USB host for charging, the charging current may be increased to about 1 A so that the charging power reaches about 5 W. Accordingly, the charging time is shortened and the user experience is improved. However, influenced by a contact resistance, the charging current of a standard USB connector cannot be increased optionally. For example, MINI-type and MICRO-type USB connectors often used by a terminal will heat up and become unreliable once the charging current exceeds 1 A. Therefore, the charging power can only reach about 5 W by means of the above scheme.

The charging power of about 5 W is still insufficient for some mobile terminals having a large-capacity battery. For example, through the above scheme, the battery of a large-size tablet PC cannot be fully charged within 2-3 hours since its capacity may exceed 6,000 mAh. A common solution for this is to design a special large-power charging interface on a terminal device. However, this may increase the additional cost and volume of the terminal and further decrease the universality of the terminal device and charger thereof, which is not favourable for economy and environmental protection.

SUMMARY

To overcome the above defect, the disclosure provides a mobile terminal, and a device and a method for charging the same.

To this end, a technical solution of the disclosure is implemented as follows.

A method for charging the mobile terminal includes that:
a power input switch is connected to a power input of a
  Voltage Bus (VBUS) of a Universal Serial Bus (USB)
  interface in the mobile terminal and is adaptive for
  turning on or off the VBUS, and a charging device for
  charging the mobile terminal includes a circuit capable
  of detecting an output current waveform of the charging device,
during charging, the mobile terminal controls the switch
  to control an input current to generate a specific current
  waveform; and
when the circuit detects the specific current waveform
  generated by the mobile terminal, an output voltage of
  the charging device is increased to charge the mobile
  terminal.

The mobile terminal may include a control switch, a Direct Current (DC)/DC charging management circuit and a battery,
wherein during the charging, the mobile terminal may
  turn on or off the current input of the VBUS by means
  of the switch to generate the specific current waveform;
  and
wherein a VBUS power passing through the control
  switch may be output to the DC/DC charging management
  circuit to charge the battery.

The charging device may include an Alternating Current (AC)/DC converter and a current waveform detection circuit, wherein an output voltage of the AC/DC converter may be adjustable; and the current waveform detection circuit may generate a logic level according to the output current waveform, to control the output voltage of the AC/DC converter.

After the charging device is connected with the mobile terminal, the mobile terminal may immediately generate the specific current waveform by means of the control switch; and after the specific current waveform is detected by the current waveform detection circuit in the charging device, an adapter may be controlled to increase the output voltage.

The mobile terminal may determine the current VBUS voltage by means of an Analog to Digital Converter (ADC); when the VBUS voltage is higher than a predetermined threshold, the mobile terminal may not interfere the charging; and when the VBUS voltage is lower than the predetermined threshold, the mobile terminal may generate a control signal to generate the specific current waveform.

A mobile terminal includes: a control switch, a charging management circuit and a battery, wherein
the control switch is configured to turn on or off a current
  input of a Voltage Bus (VBUS) to generate a specific
  current waveform; and
the charging management circuit is configured to receive
  the VBUS current passing through the control switch to
  charge the battery.

A device for charging the mobile terminal may include a circuit capable of detecting an output current waveform of the charging device; and the circuit may be configured to increase an output voltage of the charging device to charge the mobile terminal when the circuit detects the specific current waveform generated by the mobile terminal.

The mobile terminal may be configured to: determine the VBUS voltage by means of an Analog to Digital Converter (ADC); when the VBUS voltage is higher than a predetermined threshold, interfere with no charging; and when the VBUS voltage is lower than the predetermined threshold, generate a control signal to generate a specific current waveform.

A device for charging a mobile terminal is configured to charge the mobile terminal and includes an AC/DC converter and a current waveform detection circuit, wherein an output voltage of the AC/DC converter is adjustable, and the current waveform detection circuit is configured to generate a logic level according to a specific waveform of an output current, to control the output voltage of the AC/DC converter.

The mobile terminal may include a control switch, a DC/DC charging management circuit and a battery; and the mobile terminal may be configured to: during charging, turn on or off a current input of a Voltage Bus (VBUS) by means of the control switch, to generate a specific current waveform; and output the current input of the VBUS passing through the control switch to the DC/DC charging management circuit to charge the battery.

The mobile terminal may be configured to, after the charging device is connected with the mobile terminal, immediately generate the specific current waveform by means of the control switch; and the current waveform detection circuit may be configured to, after detecting the specific current waveform, control an adapter to increase the output voltage.

The mobile terminal may be configured to: determine the VBUS voltage by means of an ADC; when the VBUS voltage is higher than a predetermined threshold, interfere with no charging; and when the VBUS voltage is lower than the predetermined threshold, generate a control signal to generate a specific current waveform.

To sum up, the disclosure has the following beneficial effects:

Compared with the charging by means of a common USB interface, the charging time is greatly shortened and the user experience is improved. Compared with a special charging interface, the volume and weight of the terminal can be reduced and the universality and utilization rate of the charger can be improved, which is favourable for economy and environmental protection. Through the USB interface of the terminal, the charging power is greatly increased.

DETAILED DESCRIPTION

The disclosure provides a device for carrying out large-power charging through a USB interface and a mobile terminal, which includes a specially-designed power adapter and a charging management circuit in a portable terminal respectively. Through the technical solution of the disclosure, charging power which is considerably greater than that implemented by a common power adapter may be implemented through a USB interface. The power adapter of the disclosure can charge a common portable terminal with small and medium power as well as large power. The portable terminal can be charged not only by the power adapter of the disclosure but also by a common power adapter/USB host.

The main idea of the disclosure is as follows:

In a mobile terminal, a switch capable of switching off and switching on the power input of a VBUS is connected to the power input of the VBUS of a USB interface. During the charging, the mobile terminal controls the switch to control an input current to generate a specific current waveform. The output voltage of the power adapter is adjustable. A circuit capable of detecting the output current waveform of the power adapter is included in the power adapter. If the circuit detects the specific current waveform generated by the mobile terminal, the output voltage of the adapter is increased to increase the output power.

The disclosure is further described below by means of an embodiment in combination with the drawings.

Figure 1:
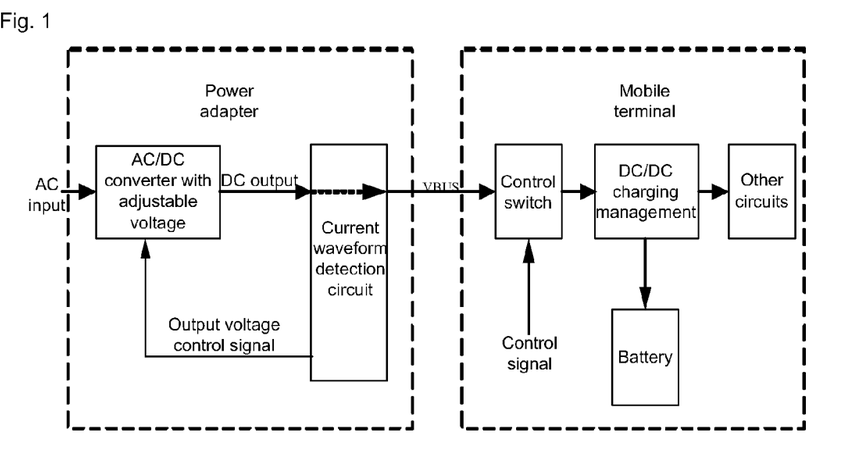
FIG. 1 is a functional block diagram showing a general system of a mobile terminal and an adapter capable of carrying out large-power charging through a USB interface according to an embodiment of the disclosure.

Refer to FIG. 1, which is a functional block diagram showing the general system of a mobile terminal and an adapter and capable of carry outing large-power charging through a USB interface according to an embodiment of the disclosure. The diagram includes two parts: the left one is the power adapter and the right one is the mobile terminal.

The mobile terminal includes a control switch, a DC/DC (DC-DC converter) charging management circuit, a battery and other circuits. During the charging, the software in the mobile terminal can turn on or off the current input of the VBUS by means of the control switch, so as to generate a specific current waveform. The VBUS current passing through the control switch is output to the DC/DC charging management circuit to charge the battery and supply power to other circuits of the terminal.

The power adapter includes an AC/DC converter and a current waveform detection circuit. The output voltage of the AC/DC converter is adjustable. The current waveform detection circuit can generate a logic level according to the specific waveform of the output current, to control the output voltage of the AC/DC converter.

Before the power adapter is connected to the mobile terminal, the power adapter outputs a voltage of 5V since the current waveform detection circuit in the power adapter does not detect any specific current waveform. After the adapter is connected to the mobile terminal, the mobile terminal immediately generates a specific current waveform by means of the control switch. After the specific current waveform is detected by the current waveform detection circuit in the adapter, the adapter is controlled to increase the output voltage, so as to increase the charging power.

Figure 2:
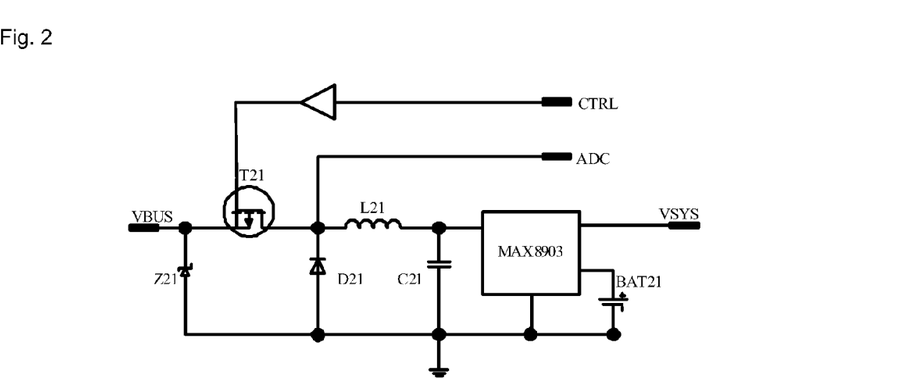
FIG. 2 is a diagram of a related circuit in a mobile terminal according to an embodiment of the disclosure.

Refer to FIG. 2, which is a diagram of a related circuit in a mobile terminal according to an embodiment of the disclosure. A CTRL (control) signal controlled by charging management software controls the turn-on/turn-off of a P-channel Metal Oxide Semiconductor (PMOS) T21 by means of a driver. The power passing through T21 supplies power to a charging management chip MAX8903 through a low-pass filter network consisting of L21 and C21. The low-pass filter can prevent the working pulse of MAX8903 from influencing the current waveform on the VBUS. Z21 and D21 in FIG. 2 are used for preventing the high voltage induced in the circuit at the instant of turn-off of T21 from damaging T21. Besides, the VBUS signal is further transmitted to the ADC of the system, so that the software running in the mobile terminal can read the current VBUS voltage.

In FIG. 2, MAX8903 is a DC/DC charging chip with dynamic path management. When there is an external power source, the external power source is converted by the DC/DC converter to supply power to the VSYS (the voltage of the system) and the battery. When there is no external power source, the battery supplies power to the VSYS. The upper limit of the input current of MAX8903 is set to 1 A in the embodiment. The acceptable maximum input voltage of MAX8903 is 16V, and MAX8903 can work normally when the input VBUS voltage reaches 10V.

Figure 3:
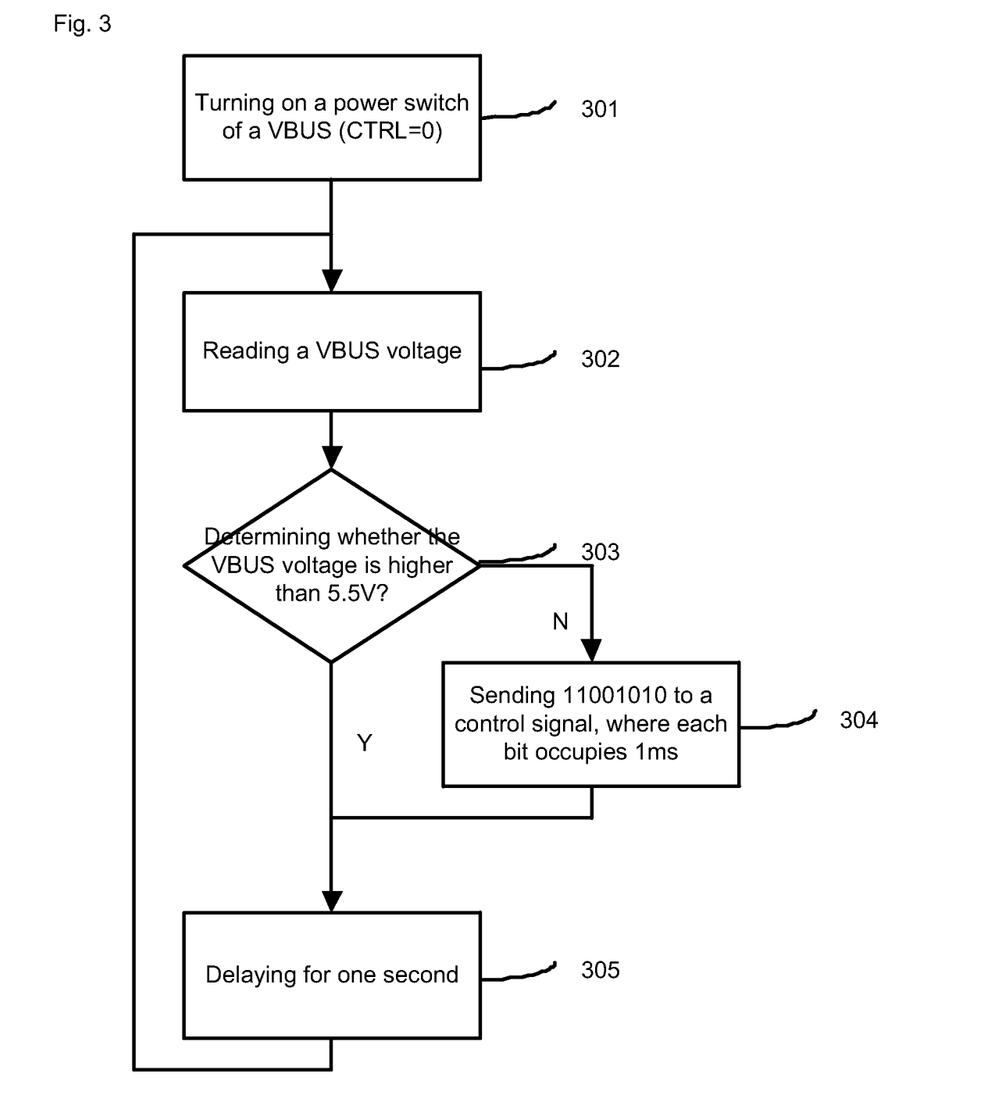
FIG. 3 is a work flowchart of software related to large-power charging in a mobile terminal according to an embodiment of the disclosure.

Refer to FIG. 3, which is a working flowchart of software related to large-power charging in a mobile terminal according to an embodiment of the disclosure. The flow includes the following steps:

Step 301: The power switch of the VBUS is turned on.
Step 302: The VBUS voltage is read.
Step 303: It is determined whether the VBUS voltage is higher than 5.5V. If the VBUS voltage is higher than 5.5V, Step 305 is executed. If the VBUS voltage is no higher than 5.5V, Step 304 is executed.
Step 304: 11001010 is sent to a control signal, where each bit occupies 1 ms.
Step 305: Step 302 is executed after it is delayed for one second.

The software determines the current VBUS voltage for one time by means of the ADC every other second. If the current VBUS voltage is higher than 5.5V, it is indicated that the external adapter has entered a high-voltage output state, so the charging is not interfered. However, if the current VBUS voltage is lower than 5.5V, the software generates a control signal by using a CTRL signal, so as to control T1 to generate a preset current waveform. The relationship between the current waveform and the control signal may refer to FIG. 7. In the embodiment, the control sequence is 11001010B, and is represented as hexadecimal numbers 0CAH.

In the embodiment, the determination standard is set to 5.5V voltage, which is a preset threshold. In other embodiments, it can be other values.

Figure 4:
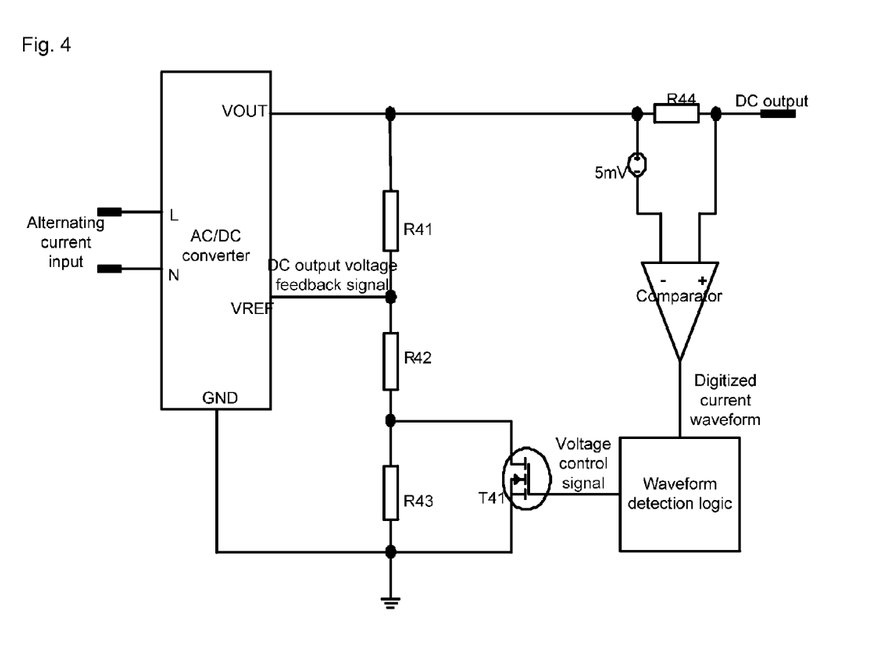
FIG. 4 is a diagram showing the internal principle of a power adapter according to an embodiment of the disclosure.

FIG. 4 is a diagram showing the internal principle of a power adapter according to an embodiment of the disclosure. The voltage feedback network of the AC/DC converter consists of R41/R42/R43/T41. The voltage reference (VREF) at the feedback end of the AC/DC adapter is 2.5V. If R41=1 Kohm, R42=330 ohm, R43=670 ohm, when the control signal is a low level, the NMOS (N-channel metal oxide semiconductor) T41 is not conductive, and the output voltage is:

$$VOUT=VREF*(R41+R42+R43)/(R42+R43)=5V$$

When the control signal is a high level, T41 is conductive, R43 is short-circuited, and the output voltage is:

$$VOUT=VREF*(R41+R42)/R42=10V$$

Figure 7:
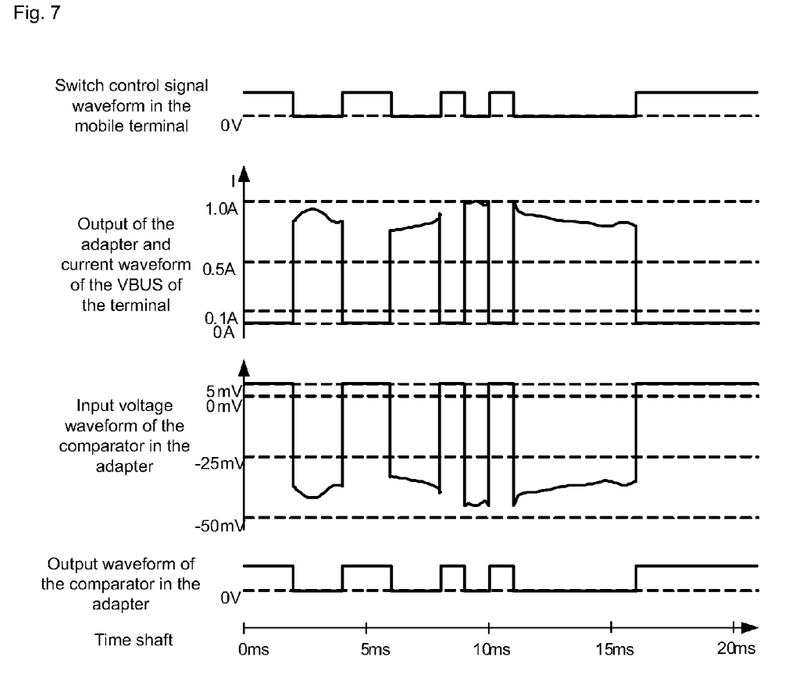
FIG. 7 is a comparison chart of a switch control signal waveform and a current waveform of a mobile terminal and an input voltage waveform and an output current waveform of a comparator in an adapter according to an embodiment of the disclosure.

In FIG. 4, a resistor R44, which is 0.05 ohm, is connected in the DC output path in series. The voltage drop of the resistor reflects the output current of the current adaptor. The voltage drop is added with a bias voltage of 5 mV and then is transmitted to a comparator. When the output current is greater than 0.1 A, the voltage drop of the resistor is greater than 5 mV and the comparator outputs a low level. When the output current is lower than 0.1 A, the comparator outputs a high level. If the output current of the adaptor is varying, the comparator takes 0.1 A as a comparison threshold, and digitizes the current waveform. The relationships between the digitized current waveform and the input voltage waveform and output current waveform of the comparator in the adapter are as shown in FIG. 7.

The waveform detection logic circuit in FIG. 4 outputs a low-level signal by default so that the output voltage of the AC/DC converter is 5V. If the waveform detection logic circuit detects a specific digital waveform (which is 11001010B in the embodiment), a high-level signal is output so that the output voltage of the AC/DC converter rises to 10V. Once the waveform detection logic circuit detects that the input signal is high (corresponding to an output current of lower than 0.1 A), it is indicated that the terminal does not need large-power charging or the adaptor is removed. The logic circuit restores to a low level at once, and the output voltage of the adapter is controlled to be back to 5V.

Figure 5:
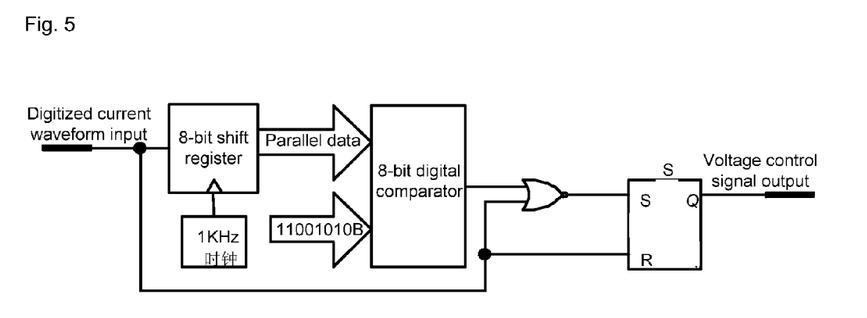
FIG. 5 is a block diagram showing the principle of a waveform detection logic circuit according to an embodiment of the disclosure.

FIG. 5 is a functional block diagram showing the aforementioned waveform detection logic circuit. The waveform detection logic circuit includes a clock generator, a shift register, a digital comparator, a NOR gate and a RS (Restoration-Setting) flip-flop.

The clock generator generates a clock of 1 kHz regularly, which is taken as a working clock of the shift register. At the rising edge of the clock, the shift register samples an input signal, which is shifted to the shift sequence of the shift register.

One input end of the digital comparator in FIG. 5 comes from the parallel output of the shift register, and the other input end is inputted by a specific value as the same as the switch control signal of the terminal, i.e., 11001010B. The digital comparator outputs a low level when the data of 8 bits at both the two ports are completely identical; otherwise, the digital comparator outputs a higher level as long as one bit is different.

The RS flip-flop in the logic circuit outputs a low level by default. A low level is output by the RS flip-flop when the R terminal is at a high level. A high level is output by the RS flip-flop when the S terminal is detected to be at a high level. The NOR gate is to make the signal of the R terminal preferred when both R and S are active, so as to ensure that, the current declines and the output of the adapter may be restored to 5V at once when the power adaptor is pulled out from the terminal.

Figure 6:
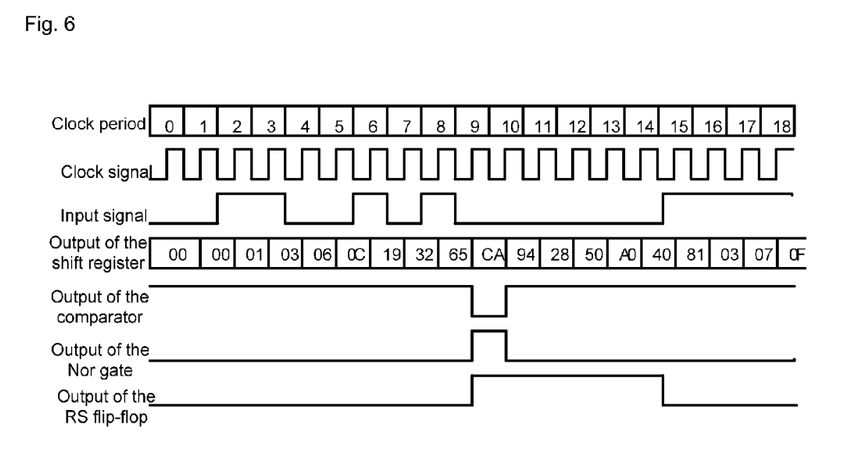
FIG. 6 is a diagram showing the working process of a logic circuit in the working principle of a circuit according to an embodiment of the disclosure.

FIG. 6 is a diagram showing the working process of a logic circuit in the working principle of a circuit according to an embodiment of the disclosure. In an initial state, the shift sequence in the shift register is all 0, and the RS flip-flop outputs a low level. An input signal starts to send the sequence 11001010B to the shift register from the 2nd clock period till all 8 bits enter the shift register at the rising edge of the 9th clock. Then, the output value of the shift register is just 11001010B (i.e., hexadecimal numbers 0CAH). At this moment, the signals of two input terminals of the digital comparator are completely the same. The output flips from 1 to 0, and after passing through the NOR gate, the RS flip-flop is controlled to be flipped to change the output from 0 to 1 (correspondingly, the output voltage of the adapter rises to 10V).

From the 10th clock period to the 14th clock period, the comparator continuously outputs a high level since the two input terminals of the comparator have different data. During this period, both the two input terminals of the RS flip-flop are 0, and the output state is maintained to be 1 (correspondingly, the output voltage of the adapter is maintained to be 10V).

In the 15th clock period, the input signal changes to 1 (correspondingly, the adapter is pulled out or the charging is completed). At this moment, since R and S of the RS flip-flop are 1 and 0 respectively, the output of the flip-flop immediately flips from 1 to 0 (correspondingly, the output voltage of the adapter restores to 5V) and maintains the same until the 18th clock period. In this stage, due to the presence of the NOR gate, the output level of the comparator does not affect the input and output of the RS flip-flop.

According to the power adapter and the mobile terminal described in the embodiment, the power of 10 W can be input to the mobile terminal when only current of 1 A passes through the USB interface, so the power adapter in the embodiment is significantly better than the power adapter with a common USB interface.

The adapter described in the embodiment may also charge a mobile device with a common USB interface. In this case, since the adapter cannot receive a specific current waveform from the mobile terminal, the output voltage still maintains at the standard voltage of 5V, which will not damage the mobile terminal, thereby ensuring the universality of the adapter.

The above are only the preferred embodiments of the disclosure, and are not intended to limit the scope of protection of the claims of the disclosure.

The invention claimed is:

1. A method for charging a mobile terminal, wherein a power input switch is connected to a power input of a Voltage Bus (VBUS) of a Universal Serial Bus (USB) interface in the mobile terminal and is adaptive for turning on or off the VBUS, and a charging device for charging the mobile terminal comprises a circuit capable of detecting an output current waveform of the charging device, the method comprising:
   during charging, controlling, by the mobile terminal, the switch to control an input current to generate a specific current waveform; and
   when the circuit detects the specific current waveform generated by the mobile terminal, increasing an output voltage of the charging device to charge the mobile terminal.

2. The method according to claim 1, wherein the mobile terminal comprises a control switch, a Direct Current (DC)/DC charging management circuit and a battery,
   wherein during the charging, the mobile terminal turns on or off the current input of the VBUS by means of the switch, to generate the specific current waveform; and
   wherein a VBUS power passing through the control switch is output to the DC/DC charging management circuit to charge the battery.

3. The method according to claim 2, wherein after the charging device is connected with the mobile terminal, the mobile terminal immediately generates the specific current waveform by means of the control switch; and after the specific current waveform is detected by the current waveform detection circuit in the charging device, an adapter is controlled to increase the output voltage.

4. The method according to claim 3, wherein the mobile terminal determines the VBUS voltage by means of an Analog to Digital Converter (ADC); when the VBUS voltage is higher than a predetermined threshold, the mobile terminal does not interfere with the charging; and when the VBUS voltage is lower than the predetermined threshold, the mobile terminal generates a control signal to generate the specific current waveform.

5. The method according to claim 1, wherein the charging device comprises an Alternating Current (AC)/DC converter and a current waveform detection circuit, wherein an output voltage of the AC/DC converter is adjustable; and the current waveform detection circuit generates a logic level according to the output current waveform, to control the output voltage of the AC/DC converter.

6. The method according to claim 5, wherein after the charging device is connected with the mobile terminal, the mobile terminal immediately generates the specific current waveform by means of the control switch; and after the specific current waveform is detected by the current waveform detection circuit in the charging device, an adapter is controlled to increase the output voltage.

7. The method according to claim 6, wherein the mobile terminal determines the VBUS voltage by means of an Analog to Digital Converter (ADC); when the VBUS voltage is higher than a predetermined threshold, the mobile terminal does not interfere with the charging; and when the VBUS voltage is lower than the predetermined threshold, the mobile terminal generates a control signal to generate the specific current waveform.

8. The method according to claim 1, wherein after the charging device is connected with the mobile terminal, the mobile terminal immediately generates the specific current waveform by means of the control switch; and after the specific current waveform is detected by the current waveform detection circuit in the charging device, an adapter is controlled to increase the output voltage.

9. The method according to claim 8, wherein the mobile terminal determines the VBUS voltage by means of an Analog to Digital Converter (ADC); when the VBUS voltage is higher than a predetermined threshold, the mobile terminal does not interfere with the charging; and when the VBUS voltage is lower than the predetermined threshold, the mobile terminal generates a control signal to generate the specific current waveform.

10. A mobile terminal, comprising: a control switch, a charging management circuit and a battery, wherein
   the control switch is configured to turn on or off a current input of a Voltage Bus (VBUS) to generate a specific current waveform; and
   the charging management circuit is configured to receive the VBUS current passing through the control switch to charge the battery,
   wherein the mobile terminal is configured to determine the VBUS voltage by means of an Analog to Digital Converter (ADC); interfere with no charging when the VBUS voltage is higher than a predetermined threshold; and generate a control signal to generate the specific current waveform when the VBUS voltage is lower than the predetermined threshold.

11. The mobile terminal according to claim 10, wherein a device for charging the mobile terminal comprises a circuit capable of detecting an output current waveform of the charging device; and the circuit is configured to increase an output voltage of the charging device to charge the mobile terminal when the circuit detects the specific current waveform generated by the mobile terminal.

12. A device for charging a mobile terminal, configured to charge the mobile terminal, wherein the device comprises an Alternating Current (AC)/Direct Current (DC) converter and a current waveform detection circuit, wherein an output voltage of the AC/DC converter is adjustable, and the current waveform detection circuit is configured to generate a logic level according to a specific waveform of an output current, to control the output voltage of the AC/DC converter,
   wherein after the device is connected with the mobile terminal, the mobile terminal immediately generates the specific current waveform by means of a control switch; and the current waveform detection circuit is further configured to, after detecting the specific current waveform, control an adapter to increase the output voltage.

13. The device according to claim 12, wherein the mobile terminal comprises a control switch, a DC/DC charging management circuit and a battery; and the mobile terminal is configured to: during charging, turn on or off a current input of a Voltage Bus (VBUS) by means of the control switch, to generate a specific current waveform; and output the current input of the VBUS passing through the control switch to the DC/DC charging management circuit to charge the battery.

14. The device according to claim 12, wherein the mobile terminal is configured to: determine the VBUS voltage by means of an Analog to Digital Converter (ADC); when the VBUS voltage is higher than a predetermined threshold, interfere with no charging; and when the VBUS voltage is lower than the predetermined threshold, generate a control signal to generate a specific current waveform.

* * * * *